May 30, 1961    R. O. TURNQUIST ET AL    2,986,335
TURBOJET ENGINE FUEL DISTRIBUTION SYSTEM
Filed Jan. 28, 1960
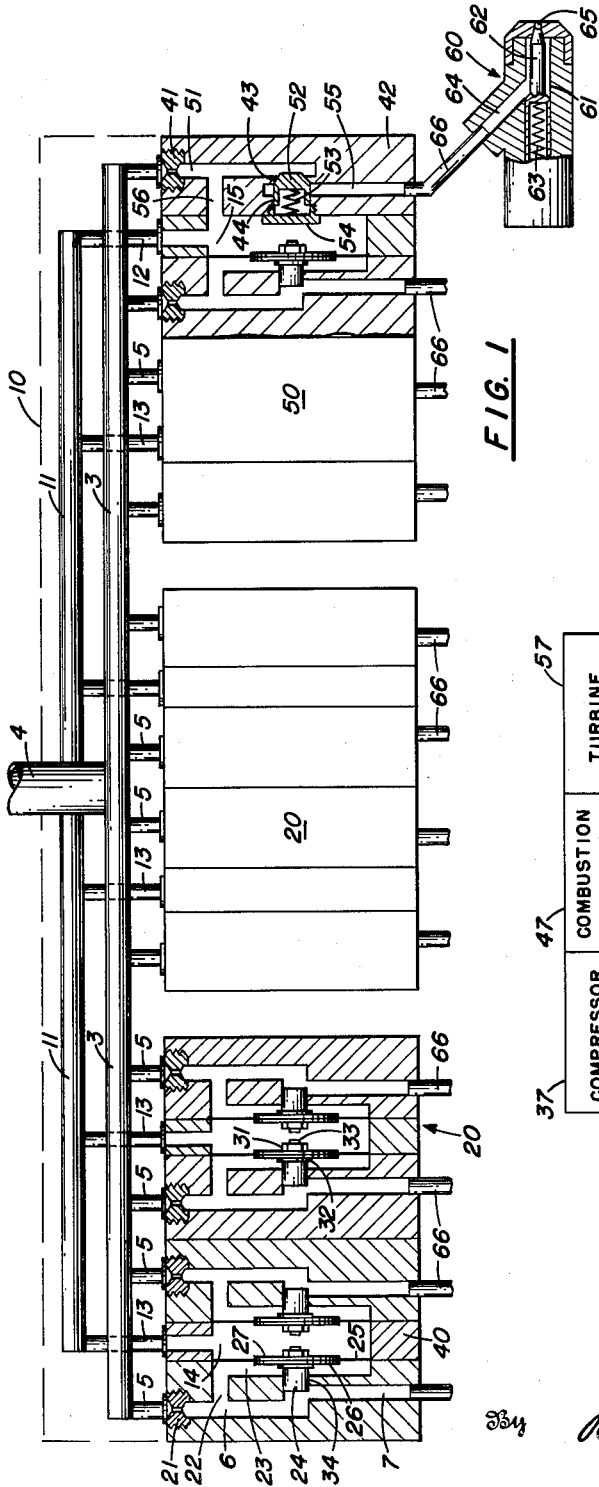
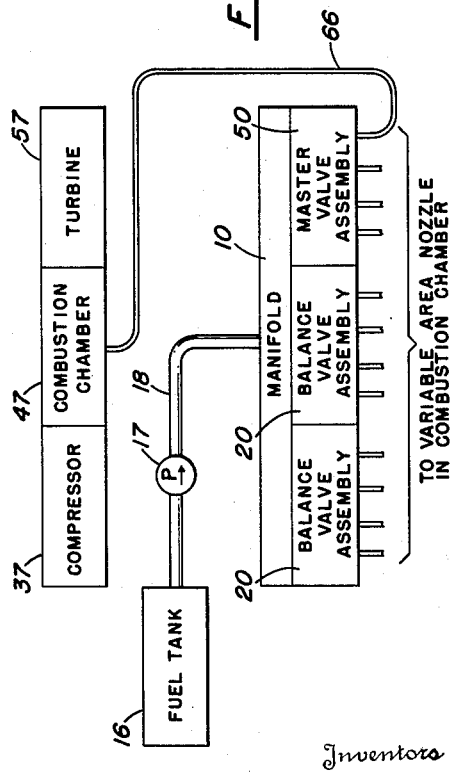
Inventors
RALPH O. TURNQUIST
LEE B. WENNER
By R. J. Tompkins
                   Attorney 2,986,335
Patented May 30, 1961

2,986,335
TURBOJET ENGINE FUEL DISTRIBUTION SYSTEM

Ralph O. Turnquist, Lindsborg, Kans., and Lee B. Wenner, Melrose, Mass., assignors, by mesne assignments, to the United States of America as represented by the Secretary of the Navy Filed Jan. 28, 1960, Ser. No. 5,314
4 Claims. (Cl. 239—76)

The present invention relates to a turbojet engine fuel distribution system which provides equal distribution of fully atomized fuel throughout an extreme range of operating conditions by utilizing the good low flow metering characteristics of variable area fuel nozzles in combination with fixed area orifices and other proven components to overcome the poor flow dividing and metering characteristics of variable area nozzles at higher fuel flows.

In order to provide adequate atomization of fuel spray to start a turbojet engine a fuel nozzle pressure drop of between 15 and 25 p.s.i. is required for the presently used jet fuels. Simplex swirl type nozzles meeting this pressure drop requirement for the starting range impose excessively high fuel system pressures at the maximum fuel flow requirement. Dual orifice type nozzles have been used to overcome this problem but require the use of a dual manifold piping system and present a small range of fuel flows where steady state engine operation is restricted. Variable area nozzles can also be used to obtain the required pressure drop and still allow maximum fuel flows without excessively high pressure drop. However, because of manufacturing tolerances it is not economically feasible to flow match variable area nozzles at maximum engine fuel flows.

The present invention utilizes the good low flow atomization characteristics of variable area fuel nozzles by uniquely combining fixed area orifices and flow balancing components with the variable area nozzles to overcome the poor flow matching of the variable area nozzles at the higher fuel flows.

An object of the present invention is the provision of a fuel distribution system which supplies properly atomized fuel equally to a plurality of combustion chamber points at all ranges of fluid flow.

Another object is to provide a fluid distribution system for supplying equal quantities of properly atomized fluid which has provisions for adapting the system to the requirements of a number of different engines.

Still another object of the present invention is the provision of a compact, lightweight fuel distribution system especially suitable for use in a turbojet engine fuel system.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a schematic elevation view partly in section of a preferred embodiment of the invention.

Fig. 2 is a fragmental schematic view of an aviation gas turbine power plant equipped with fuel supply apparatus constructed in accordance with the invention.

Referring now to the drawings wherein like reference characters designate like or corresponding parts throughout the figures, there is shown in Fig. 2 a schematic arrangement wherein the apparatus of this invention is adapted for use in the fuel system of a turbojet engine having a compressor section 37, a combustion chamber section 47 and a turbine section 57. Fluid from any suitable source such as tank 16 and under pressure created by a suitable means such as pump 17 is delivered through inlet duct 18 to a manifold housing 10. In Fig. 1, manifold housing 10 is shown to contain a fluid distribution manifold 3 having an inlet 4 and outlets 5. The outlets connect to balance valve assemblies 20 which control the equal distribution of maximum fluid flows. These assemblies have a housing 40 containing an even number multiple of flow paths, four being shown for illustrative purposes. Each flow path has an inlet passageway 6 which contains a removable fixed area orifice 21 whereby the whole system may be adapted to the requirements of a variety of engines merely by replacing this readily accessible element and an outlet 7 completes the fluid flow path. A plug valve 24 is interposed between each inlet 6 and outlet 7 in bore 34 thus controlling the quantity of fluid flowing therethrough; a valve 24 is attached to a diaphragm 25 by two washers 26 and 27; the washer 26 is bottomed on head 32 of plug valve 24 and underlies the central portion of diaphragm 25 while a second washer 27 overlies the diaphragm 25 concentric with the washer 26 and a nut 31 threaded on the upper end 33 of the plug clamps the washers 26 and 27 onto the diaphragm.

The diaphragms are mounted in balance valve housing 40 to form a pressure chamber 23 in front of the diaphragm; pressure chamber 23 receives fluid from inlet passageway 6 through passageway 22. The back sides of the diaphragms form balance pressure chambers 14; the balance pressure chambers have inlets 13 which are connected to a master valve assembly 50 through a balance pressure manifold 11.

The master valve assembly 50 is identical to the balance valve assembly except that one of the diaphragm actuated plug valves is replaced by a master servo control valve 52 which establishes the balance pressure in the balance pressure manifold. An inlet passageway 51 connects a fluid distribution manifold outlet to the upstream side of the control valve; a master servo control valve metering orifice 41 is mounted in the inlet passageway 51; outlet passageway 55 connects the downstream side of the control valve with a master variable area fuel nozzle 60 which will be described at greater lengths later. Control valve 52 is inserted in a cylindrical bore 44 in the master valve housing 42; the control valve is biased by spring 53 against a valve seat 43 formed in the housing between passageways 51 and 55; spring 53 is held in bore 44 by screw cap 54. A control balance chamber 15 is formed in the master valve housing. This chamber communicates with the balance pressure manifold through passageway 12 and also is connected to control valve inlet passageway 51 by passageway 56.

The aforesaid construction provides a compact, lightweight fuel distributing assembly since the manifold housing 10 provides the means for integrating the balance valve assemblies 20 and the master valve assembly 50 into one package and then provides a means for mounting this package to the engine. The only accessory piping required is one inlet line 18 and as many discharge conduits 66 as there are fuel nozzles.

The fluid flow from the balance valve assemblies and master valve assembly outlets passes through conduits 66 to a separate variable area fuel nozzle 60 for each outlet. The specific details of the variable area nozzle described below forms no part of the present invention and the nozzle may be any one of the many well known types. The embodiment shown herein is for illustration only and is used to better set out the operation of the subject invention. These nozzles control the fluid distribution at low fluid flows and only one is illustrated; each nozzle has a cylindrical bore 61 with a piston valve 62 slidably mounted therein; the piston valve 62 is subject to the opposing pressures of a spring 63 and of fuel admitted to the bore 61 by way of an inlet passageway 64 and is operative according to the fuel pressure for effecting discharge of fuel at a variable rate from the bore through an outlet opening 65. It is to be understood that at low flow rates (those which create only 2 to 5 p.s.i. across the removable orifices 21) the nozzles 60 operate as fixed area nozzles for a given flow rate and provide both proper atomization and equal distribution of fuel; during this phase of fluid flow the balance valve assembly does not meter any fuel.

Thus, in the starting and low engine fuel flow ranges the variable area nozzles 60 alone accurately meter fuel into the combustion chamber 47. At higher engine fuel flows the variable area nozzles open up and are no longer effective in equalizing fluid flows. Then the fixed area metering orifices 21, in series with each nozzle, take over the job of making certain that each nozzle discharges the same amount of fuel into the combustion chamber for even burning. In order for the orifices to accomplish this, balance valves are provided to equalize the pressure drops across each metering orifice 21. This insures that each orifice will discharge exactly the same amount of fuel to each variable area fuel nozzle 60 even though the nozzles are not flow matched.

The operation of the fuel distribution follows: The master servo control valve 52 establishes a discharge pressure level (balance pressure) against its metering orifice 41. This pressure is transmitted to all balance pressure chambers 14 through passageway 56, control balance chamber 15, and balance pressure manifold 11. The balance valves then sense balance pressure on one side of their diaphragms and the discharge pressure of their respective metering orifices on the other. Since the areas are equal on both sides of the balance valve diaphragm, the valve 24 will so position itself to make the discharge pressure of its metering orifice 21 equal to the balance pressure—which is the discharge pressure of the master servo valve metering orifice 45. Thus, regardless of unequal pressures in conduits 66 the discharge pressures of all metering orifices 21 will be equal. Since a common passageway 4 in the manifold supplies fuel to the inlets of all metering orifices, the inlet pressures to all metering orifices are essentially equal. And, since the area of each metering orifice is aproximately equal, the fuel flow discharge through each metering orifice will be essentially equal regardless of differences in downstream back pressure which result because the variable area fuel nozzles cannot be accurately flow matched at the higher fuel flows.

Obviously many modifications and variations of the present invention are possible in the light of the above teachings. It is therefore to be understood that within the scope of the appended claims the invention may be practiced otherwise than as specifically described.

What is claimed is:

1. A fluid distribution system for equalizing fluid flows in a plurality of conduits through a wide range of operating conditions comprising a fluid distribution manifold, a plurality of balance valve assemblies connected to said fluid distribution manifold and receiving fluid therefrom, a single master valve assembly connected to the downstream side of said fluid distribution manifold, a balance pressure manifold connected to the downstream side of said master valve assembly, said distribution manifold supplying fuel to said balance valve assemblies, said balance pressure manifold supplying balancing pressure to said balance valve assemblies for controlling the operation of said balance valve assemblies, said master valve assembly controlling the amount of fluid being supplied to said balance pressure manifold which in turn controls the amount of fluid passing through said balance valve assemblies, a variable area nozzle connected to each of said balance valve assemblies and also said master valve assembly whereby said balance valve assembly equally distributes high volume fluid flow and said variable area nozzles equally distribute low volume fluid flow.

2. A system as claimed in claim 1 wherein each of said balance valve assemblies comprises a housing, having an even number multiple of balancing valves mounted therein and an inlet passageway and outlet passageway to each of said valves; a fixed area metering orifice mounted in each inlet passageway; and means for regulating said valves.

3. A system as claimed in claim 1 wherein said master valve assembly comprises a housing having a master servo check valve mounted therein and an inlet passageway and outlet passageway to said valve; a fixed area master metering orifice mounted in said inlet; a control chamber in said housing connected to said inlet and an outlet from said chamber communicating with said manifold means.

4. A compact fluid distribution system suitable for use in the fuel system of a turbojet driven aircraft comprising a manifold housing; a fluid distributing system in said housing; a balance pressure system in said housing; at least one balance valve assembly having a housing which contains an even number multiple of balance valves; a plurality of variable area nozzles; an inlet and outlet to each of said balance valves; a balance pressure chamber for each pair of valves; said balance pressure chamber being formed by said housing and a pair of diaphragms; said diaphragms each being connected to a single valve; an inlet to each said chamber being connected to said balance pressure system; each said inlet to said balance valve being connected to said fluid distributing system and each said outlet being connected to one of said variable area nozzles; a master valve assembly having a housing which contains an odd number of balance valves and a single master servo check valve; an inlet and outlet to said balance valves and an inlet and outlet to said master servo check valve; a removable fixed area metering orifice in each inlet and a balance pressure chamber for each pair of valves; an outlet for each said chamber connected to said balance pressure system; said chamber for the master servo check valve being connected to the inlet to said master servo check valve; each said inlet to each master valve being connected to said fluid distributing system and each said outlet being connected to one of said variable area nozzles whereby said variable area nozzles equally distribute low fluid flows and said balance valve assembly equally distribute high fluid flows.

References Cited in the file of this patent
UNITED STATES PATENTS

| | | |
|---|---|---|
| 2,622,610 | Rowe et al. | Dec. 23, 1952 |
| 2,638,912 | Lee | May 19, 1953 |
| 2,661,756 | Noon et al. | Dec. 8, 1953 |
| 2,669,482 | Gold et al. | Feb. 16, 1954 |
| 2,706,520 | Chandler | Apr. 19, 1955 |
| 2,809,653 | Gold et al. | Oct. 15, 1957 |
| 2,870,777 | Gold et al. | Jan. 27, 1959 |